United States Patent
Hetrick

(10) Patent No.: US 7,136,966 B2
(45) Date of Patent: Nov. 14, 2006

(54) METHOD AND APPARATUS FOR USING A SOLID STATE DISK DEVICE AS A STORAGE CONTROLLER CACHE

(75) Inventor: William A. Hetrick, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 642 days.

(21) Appl. No.: 10/100,150

(22) Filed: Mar. 18, 2002

(65) Prior Publication Data

US 2003/0177305 A1 Sep. 18, 2003

(51) Int. Cl.
*G06F 12/08* (2006.01)

(52) U.S. Cl. ........................ 711/122; 711/113

(58) Field of Classification Search ............... 711/113, 711/104, 103, 105, 122, 133, 136
See application file for complete search history.

(56) References Cited

U.S. PATENT DOCUMENTS

| | | | |
|---|---|---|---|
| 5,420,998 A * | 5/1995 | Horning | 711/113 |
| 5,734,859 A | 3/1998 | Yorimitsu et al. | |
| 5,754,753 A * | 5/1998 | Smelser | 714/8 |
| 5,805,787 A | 9/1998 | Brant et al. | |
| 5,835,940 A | 11/1998 | Yorimitsu et al. | |
| 5,974,503 A | 10/1999 | Venkatesh et al. | |
| 6,094,728 A * | 7/2000 | Ichikawa et al. | 714/6 |
| 6,321,298 B1 | 11/2001 | Hubis | |
| 6,330,642 B1 | 12/2001 | Carteau | |
| 6,507,890 B1 | 1/2003 | Morley et al. | |
| 6,567,889 B1 | 5/2003 | DeKoning et al. | |
| 6,615,313 B1 | 9/2003 | Kato et al. | |
| 6,748,487 B1 * | 6/2004 | Takamoto et al. | 711/113 |

OTHER PUBLICATIONS

White, Ron: "How Computers Work", Ziff-Davis Press, 1994; pp. 71-73.*
John M. Goodman, Ph.D, "Memory Management for All of Us", SAMS, 1992, pp. 513-515.*

* cited by examiner

*Primary Examiner*—B. James Peikari
(74) *Attorney, Agent, or Firm*—Yee & Associates, P.C.

(57) ABSTRACT

A solid state disk drive is provided among the storage devices controlled by a storage controller. The solid state disk drive may serve as a level 2 cache using standard multi-level cache management algorithms. The solid state disk may share a drive channel with other storage devices or may have a dedicated channel.

15 Claims, 3 Drawing Sheets

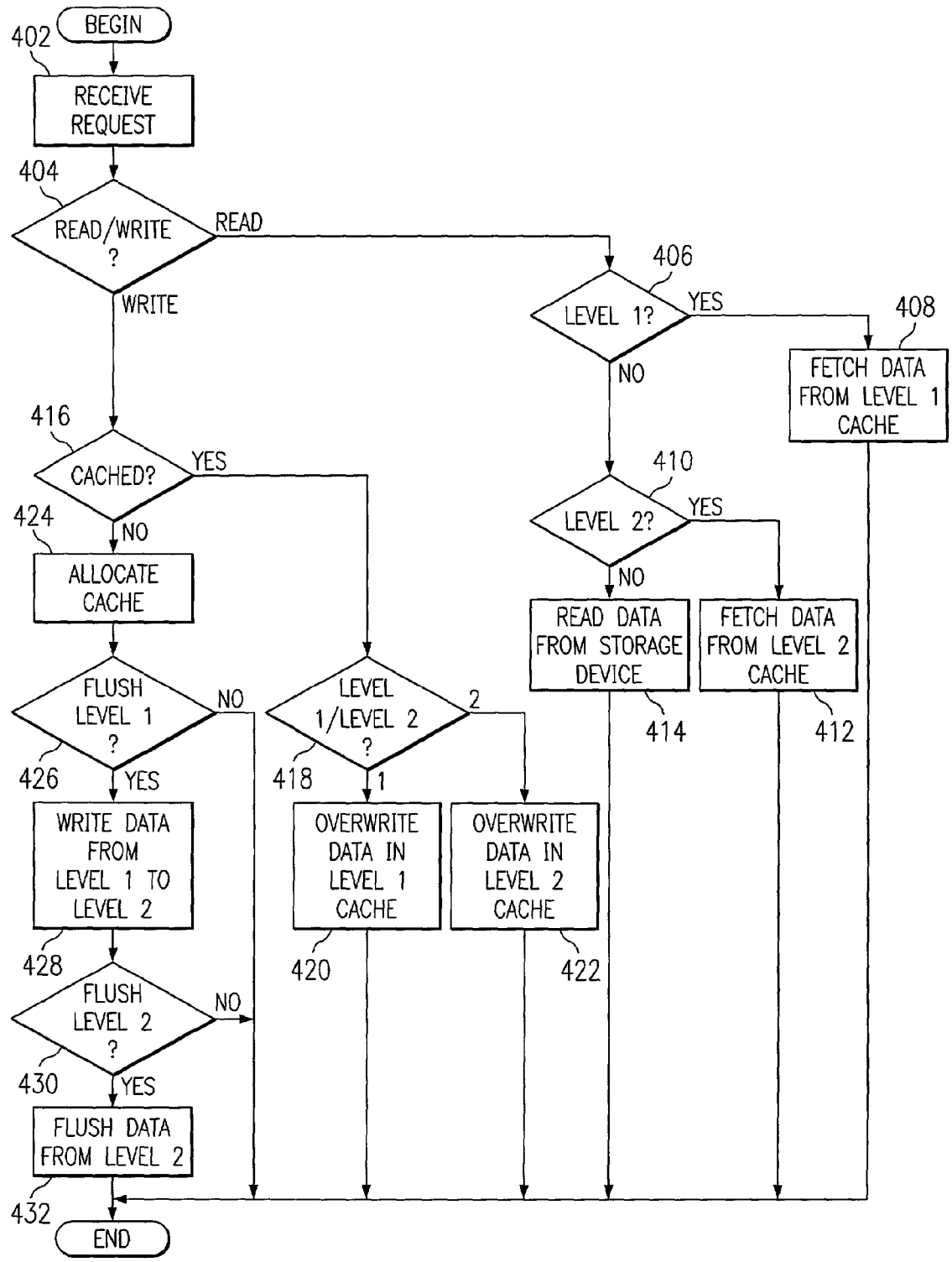

METHOD AND APPARATUS FOR USING A SOLID STATE DISK DEVICE AS A STORAGE CONTROLLER CACHE

BACKGROUND OF THE INVENTION

1. Technical Field

The present invention relates to data storage and, in particular, to data cache in a storage controller. Still more particularly, the present invention provides a method and apparatus for using a solid state disk as a storage controller level 2 cache.

2. Description of the Related Art

A storage controller is an embedded system logically connected between a host computer system and a pool of storage. FIG. 1 illustrates an example of a typical storage controller system. Input/output (I/O) host 102 sends read and write data access requests to storage module 110. The storage module includes storage controller 120 and disk drives 130. Storage controller 120 performs read and write operations to satisfy the data access requests of the I/O host.

Storage controller 120 includes I/O cache 122. This I/O cache, also referred to as storage controller level 1 cache, is located in the storage controller memory. Data blocks that are read from disk drives 0–N may be stored in the I/O cache so that frequently accessed data may be read from the faster memory device rather than the slower disk drives. Furthermore, I/O cache 122 may also serve as intermediate storage for data blocks that are written to the disk drives. Subsequent reads of these data blocks may be found in the cache, thus reducing access time.

More particularly, redundant array of independent disks (RAID) systems, may stripe data blocks and store each stripe on a different physical disk drive. For example, in the storage controller system shown in FIG. 1, a data block written to storage module 110 may be striped into N–1 stripes, each stripe being stored on a respective one of drives 0-N 130. With the greater number of reads and writes to physical drives in RAID systems, the importance of I/O cache is increased.

Therefore, it would be advantageous to provide an improved multi-level cache for storage controller systems.

SUMMARY OF THE INVENTION

The present invention provides a solid state disk drive among the storage devices controlled by a storage controller. The solid state disk drive may serve as a level 2 cache using standard multi-level cache management algorithms. The solid state disk may share a drive channel with other storage devices or may have a dedicated channel.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a flowchart illustrating the operation of a storage controller in accordance with a preferred embodiment of the present invention.

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 1:
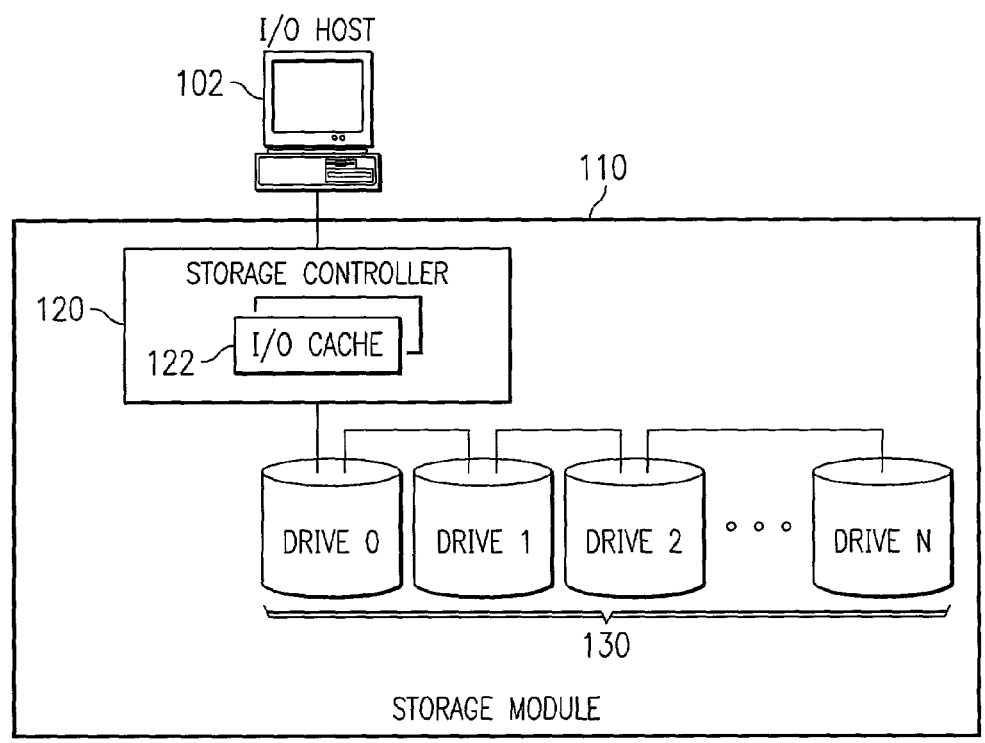
FIG. 1 illustrates an example of a typical storage controller system.
Figure 2:
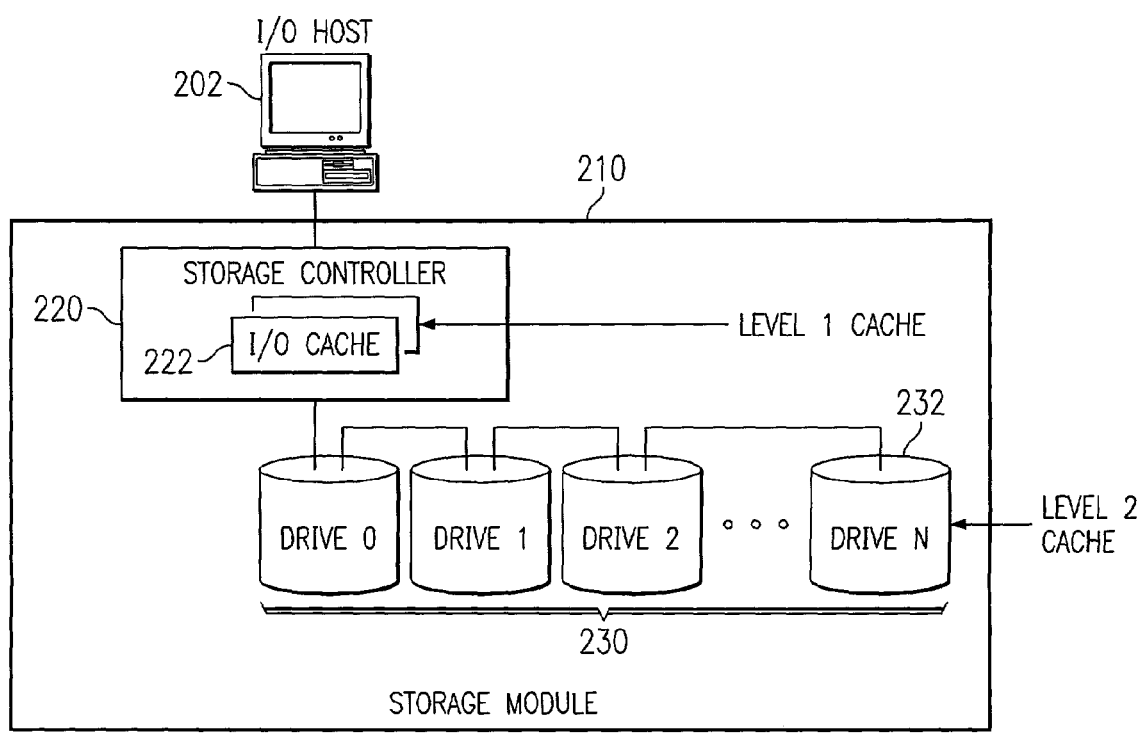
FIG. 2 illustrates an example of a storage controller system in accordance with a preferred embodiment of the present invention.

With reference now to the figures and in particular with reference to FIG. 2, a storage controller system is illustrated in accordance with a preferred embodiment of the present invention. Input/output (I/O) host 202 sends read and write data access requests to storage module 210. The storage module includes storage controller 220 and disk drives 230. Storage controller 220 performs read and write operations to satisfy the data access requests of the I/O host.

The depicted example illustrated in FIG. 2 and above-described examples are not meant to imply architectural limitations. For example, drives 230 may be hard disk drives. However, other storage devices, such as tape drives, optical disk drives, and the like, may be used in addition to or in place of the hardware shown in FIG. 2.

Storage controller 220 includes I/O cache 222, which serves as the storage controller level 1 (L1) cache. I/O cache 222 may be a random access memory (RAM). A typical example of a storage controller system may allocate 1 GB of memory for storage controller level 1 cache; however, more or less memory may be allocated for cache depending on the implementation.

Advances in memory technologies have led to the emergence of solid state disks. Solid state disk devices are essentially a non-volatile random access memory connected to an I/O channel. Due to the I/O channel protocol, memory access is not as fast for solid state disks as it is for the memory on the storage controller. However, the underlying random access memory generally has much improved I/O latency, I/O rate and sustained bandwidth as compared to hard disk drives.

In accordance with a preferred embodiment of the present invention, drives 230 also include solid state disk drive 232, which serves as the storage controller level 2 cache. With the improved performance characteristics of solid state disks over hard disk drives, solid state disk drive 232 may be used as a second level cache by a storage processor using standard multi-level cache management algorithms.

Figure 3A:
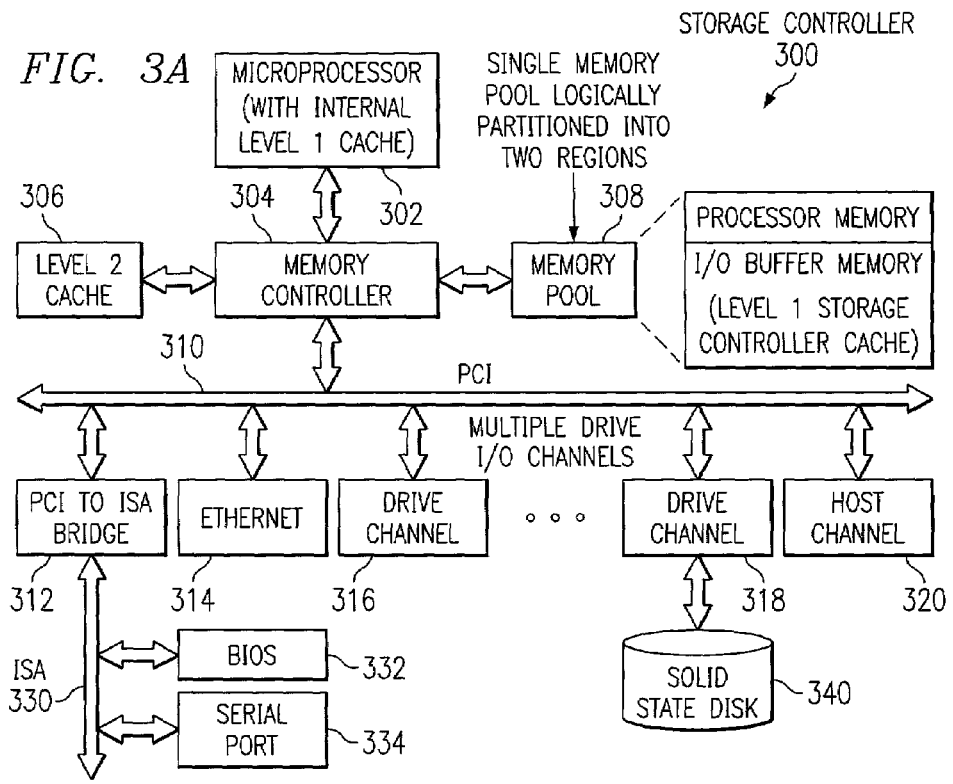
FIGS. 3A and 3B are block diagrams illustrating example storage controller architectures in accordance with a preferred embodiment of the present invention.
Figure 3B:
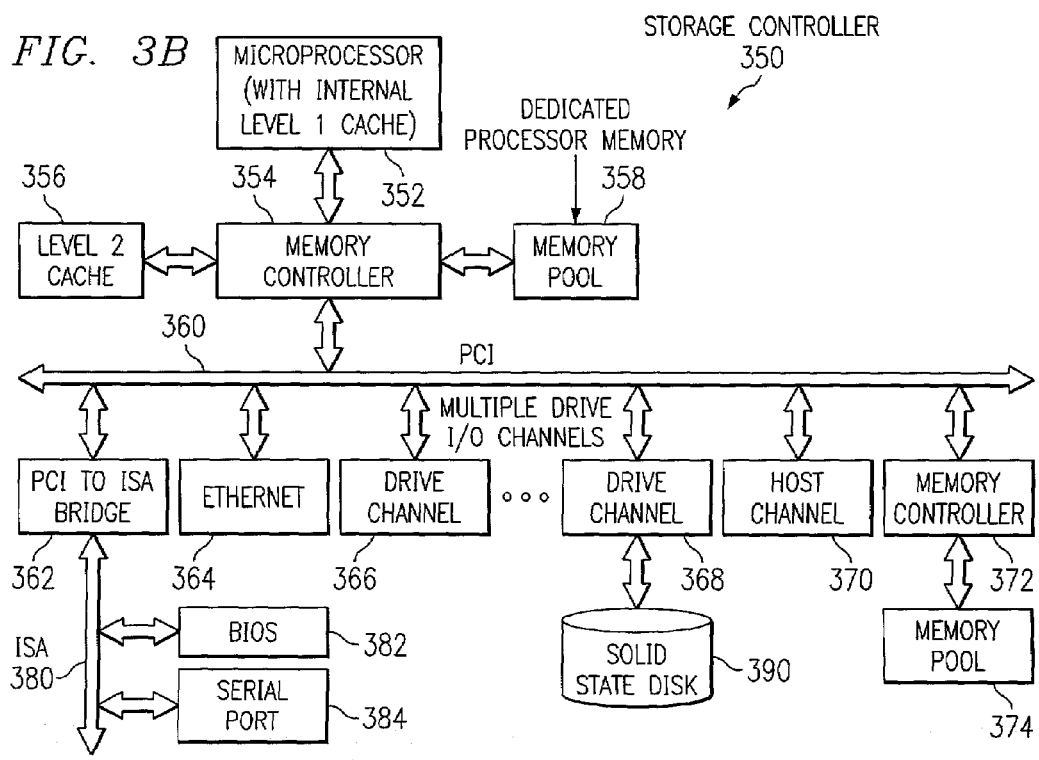

With reference now to FIGS. 3A and 3B, block diagrams are shown illustrating example storage controller architectures in accordance with a preferred embodiment of the present invention. Particularly, FIG. 3A illustrates a single-memory storage controller architecture. Storage controller 300 employs a peripheral component interconnect (PCI) local bus architecture. Although the depicted example employs a PCI bus, other bus architectures such as Industry Standard Architecture (ISA) may be used. Microprocessor 302, with internal level 1 cache, and memory pool 308 are connected to PCI local bus 310 through memory controller 304. Microprocessor level 2 cache 306 is also connected to memory controller 304. PCI bus 310 also may include an integrated memory controller and cache memory for processor 302.

In the depicted example, ethernet adapter 314, PCI to ISA bridge 312, drive channel adapters 316–318, and host channel adapter 320 are connected to PCI bus 310 by direct component connection. PCI to ISA Bridge 312 provides a connection through ISA bus 330 for basic input output system (BIOS) 332 and serial port 324.

Processor 302 is used to coordinate and provide control of various components within storage controller 300 in FIG. 3A. Instructions for the storage controller may be located on storage devices, such as BIOS 322, and may be loaded into memory pool 308 for execution by processor 302.

Memory pool 308 is a single memory pool that is logically partitioned into two regions. A first region serves as processor memory. This portion of memory is used by processor 302, for example, as "scratch pad" memory to perform the operations of the storage controller. The second region of memory pool 308 serves as I/O buffer memory or level 1 storage controller cache.

Drive channel adapters 316–318 provide drive channels for storage devices, such as hard disk drives. A storage controller may have, for example, four drive channels. Each drive channel may support multiple drives per channel. The number of drives is limited by I/O hardware and communication protocol.

In accordance with a preferred embodiment of the present invention, solid state disk 340 is connected to one of the drive channel adapters, such as drive channel adapter 318 in FIG. 3A. Solid state disk 340 serves as storage controller level 2 cache to supplement the level 1 cache stored in memory pool 308. The solid state disk may store, for example, 8 GB of data. Therefore, read request performance may be greatly improved due to an increased probability of the data residing either in the storage controller level 1 cache or the high-speed solid state disk.

Turning now to FIG. 3B, a dual-memory storage controller architecture is shown in accordance with a preferred embodiment of the present invention. Storage controller 350 employs a peripheral component interconnect (PCI) local bus architecture. Although the depicted example employs a PCI bus, other bus architectures such as Industry Standard Architecture (ISA) may be used. Microprocessor 352, with internal level 1 cache, and memory pool 358 are connected to PCI local bus 360 through memory controller 354. Microprocessor level 2 cache 356 is also connected to memory controller 354. PCI bus 360 also may include an integrated memory controller and cache memory for processor 352.

In the depicted example, ethernet adapter 364, PCI to ISA bridge 362, drive channel adapters 366–368, and host channel adapter 370 are connected to PCI bus 360 by direct component connection. PCI to ISA Bridge 362 provides a connection through ISA bus 380 for basic input output system (BIOS) 382 and serial port 384.

Processor 352 is used to coordinate and provide control of various components within storage controller 350 in FIG. 3B. Instructions for the storage controller may be located on storage devices, such as BIOS 382, and may be loaded into memory pool 358 for execution by processor 352.

Memory pool 358 is used by processor 352, for example, as "scratch pad" memory to perform the operations of the storage controller. Memory pool 374 is connected to PCI bus 360 by memory controller 372. Memory pool 374 serves as I/O buffer memory or level 1 storage controller cache.

Drive channel adapters 366-368 provide drive channels for storage devices, such as hard disk drives. In accordance with a preferred embodiment of the present invention, solid state disk 390 is connected to one of the drive channel adapters, such as drive channel adapter 368 in FIG. 3B. Solid state disk 390 serves as storage controller level 2 cache to supplement the level 1 cache stored in memory pool 374. The solid state disk may store, for example, 8 GB of data. Therefore, read request performance may be greatly improved due to an increased probability of the data residing either in the storage controller level 1 cache or the high-speed solid state disk.

Those of ordinary skill in the art will appreciate that the hardware in FIGS. 3A and 3B may vary depending on the implementation and the depicted examples in FIGS. 3A and 3B and above-described examples are not meant to imply architectural limitations. For example, the examples shown in FIGS. 3A and 3B illustrate bus architectures; however, the present invention may be implemented using other architectures, such as a switched architecture. For example, the present invention may be implemented using a fibre channel architecture.

With reference now to FIG. 4, a flowchart illustrating the operation of a storage controller is shown in accordance with a preferred embodiment of the present invention. The process begins and receives a data access request (step 402). A determination is made as to whether the data access request is a read request or a write request (step 404).

If the data access request is a read request, a determination is made as to whether the data is in level 1 cache (step 406). If the data is in level 1 cache, the process fetches the data from level 1 cache (step 408) and the process ends. If the data is not in level 1 cache in step 406, a determination is made as to whether the data is in the level 2 cache stored in the solid state disk (step 410). If the data is stored in the storage controller level 2 cache, the process fetches the data from level 2 cache in the solid state disk (step 412) and the process ends. However, if the data is not stored in level 2 cache in step 410, the process reads the data from the storage device (step 414) and ends.

Returning to step 404, if the data access request is a write request, a determination is made as to whether the data is cached (step 416). If the data is cached, a determination is made as to whether the data is cached in level 1 cache or level 2 cache (step 418). If the data is cached in level 1 cache, the process overwrites the data in level 1 cache in memory (step 420) and ends. If the data is cached in level 2 cache in step 418, the process overwrites the data in the level 2 cache in the solid state disk (step 422) and the process ends.

If the data is not cached in step 416, the process allocates space in level 1 cache for the written data (step 424). A determination is made as to whether level 1 cache needs to be flushed to make space to cache the written data (step 426). If a flush of level 1 cache is not necessary, the process ends.

If a flush of level 1 cache is necessary in step 426, the process writes data from level 1 cache to the level 2 cache in the solid state disk (step 428) and a determination is made as to whether a flush is necessary to make space to write data in level 2 cache (step 430). If a flush is not necessary, the process ends. However, if a flush is necessary in step 430, the process flushes data from level 2 cache (step 432) and ends.

Thus, the present invention provides a second level of storage controller cache using a solid state disk device. Read request performance is improved due to an increased probability of data residing in either the storage controller level 1 cache in memory or the solid state disk device.

Certain applications and I/O profiles may greatly benefit from such a feature. Specifically, some database applications use small, frequently accessed data volumes for transaction logging, in addition to the large volumes for actual record storage. Even though the volumes are small, the nature of the database application would generally allow the data to be flushed out of the storage processor cache in memory to accommodate caching other volume data, resulting in cache misses and longer latencies for this data. Using a second-level cache increases the probability that the data will be present in either the level 1 cache in memory or the second level cache in the solid state disk. The performance improvement can be achieved by simply attaching a solid state disk in parallel to the storage controller and configuring the transaction log volumes on this secondary device. However, by incorporating the solid state disk into the storage system cache, the storage system cache management would encompass this device, reducing system management complexity.

Retrieving the data from this second level cache is a less expensive operation than reading the data from the hard disks, especially if the data is striped across several disks as in a RAID storage system. Allowing the volumes to be configured as second level cacheable allows users to tune system performance for specific applications. Solid state disk devices are available in standard hard disk drive form factors. Using these devices as customer replaceable units in hard drive modules allows users to upgrade and expand simply by populating additional units in the system.

What is claimed is:

1. An apparatus for managing a cache in a computer system, comprising:
   a processor having a processor first level cache;
   a bus;
   a first memory controller coupled between the processor and the bus;
   a first memory pool coupled to the first memory controller;
   a processor second level cache coupled to the first memory controller;
   a second memory controller coupled to the bus;
   a second memory pool coupled to the second memory controller and having stored therein a controller first level cache; and
   a solid state disk, coupled to a drive channel which is coupled to the bus, having stored therein a controller second level cache,
   wherein the processor is configured to receive a request to access a data block at a storage device, and accesses the data block in the second level cache residing on the solid state disk.

2. The apparatus of claim 1, wherein the processor is further configured to determine whether a previous version of the data block is stored in the second level cache, wherein processor accesses the data block in the second level cache in response to a previous version of the data block being stored in the second level cache.

3. The apparatus of claim 2, wherein the processor is further configured to determine whether a previous version of the data block is stored in a first level cache, wherein the processor determines whether a previous version of the data block is stored in a second level cache in response to a previous version of the data block not being stored in the first level cache.

4. The apparatus of claim 3, wherein the processor is further configured to access the data block in the first level cache in response to a previous version of the data block being stored in the first level cache.

5. The apparatus of claim 2, wherein the processor is further configured to access the data block in the storage device in response to a previous version of the data block not being stored in the second level cache.

6. The apparatus of claim 2, wherein the request to access the data block is a read request and the processor accesses the data block in the second level cache by reading the data block from the solid state disk.

7. The apparatus of claim 2, wherein the request to access the data block is a write request and the processor accesses the data block in the second level cache by overwriting the data block on the solid state disk.

8. The apparatus of claim 1, wherein the request to access the data block is a write request and the processor accesses the data block in the second level cache by allocating space for the data block in a first level cache, determining whether a flush of the first level cache is desired, and writing data from the first level cache to the second level cache residing on the solid state disk in response to a flush of the first level cache being desired.

9. The apparatus of claim 8, wherein the processor is further configured to determine whether a flush of the second level cache is desired and flush data from the second level cache in response to a flush of the second level cache being desired.

10. The apparatus of claim 1, wherein the processor, the first memory controller and the second memory controller are embodied in a storage controller.

11. The apparatus of claim 10, wherein the storage device is connected to the storage controller through another drive channel.

12. A storage module comprising:
    a storage controller including a processor and a memory, wherein the memory serves as a first level storage controller cache;
    a memory controller, coupled to the processor, for controlling the first level storage controller cache and a second level processor cache; and a solid state disk, coupled to the storage controller, wherein the solid state disk serves as a second level storage controller cache, wherein the storage controller receives a request to write a data block to a storage device, allocates space for the data block in the first level storage controller cache, determines whether a flush of the first level storage controller cache is desired and, responsive to a flush of the first level storage controller cache being desired, writes data from the first level storage controller cache to the second level storage controller cache residing on the at least one solid state disk.

13. The storage module of claim 12, wherein the storage controller:
    receives a request to read a data block from a storage device;
    determines whether the data block is stored in the second level storage controller cache; and
    responsive to the data block being stored in the second level storage controller cache, reads the data block from the at least one solid state disk.

14. The storage module of claim 12, wherein the storage controller:
   receives a request to write a data block to a storage device;
   determines whether a previous version of the data block is stored in the second level storage controller cache; and
   responsive to the previous version of the data block being stored in the second level storage controller cache, overwrites the previous version of the data block on the at least one solid state disk.

15. A storage module comprising a plurality of storage devices and a storage controller coupled to the plurality of storage devices, the storage controller further comprising:
   a processor having a processor first level cache;
   a bus;
   a first memory controller coupled between the processor and the bus;
   a processor second level cache coupled to the first memory controller; and
   a first memory pool coupled to the first memory controller, the first memory pool comprising processor memory for the processor and a first level storage controller cache for the plurality of storage devices, wherein the storage module further comprises a solid state disk, coupled to a drive channel which is coupled to the bus, having stored therein a second level storage controller cache for the plurality of storage devices, wherein the processor is configured to receive a request to access a data block at one of the plurality of storage devices, and to access the data block in the second level storage controller cache residing in the solid state disk.

* * * * *